United States Patent [19]
Bargy

[11] Patent Number: 5,970,918
[45] Date of Patent: Oct. 26, 1999

[54] AQUARIUM-TERRARIUM ECOSYSTEM APPARATUS

[76] Inventor: Roy D. Bargy, 1962 Nevada St., Toledo, Ohio 43605

[21] Appl. No.: 09/052,750

[22] Filed: Mar. 31, 1998

[51] Int. Cl.[6] .................................................. A01K 63/00
[52] U.S. Cl. ........................................................ 119/246
[58] Field of Search .................................... 119/245, 246, 119/247, 248, 251, 253, 265, 266, 267, 269; D30/101, 105, 106, 107

[56] References Cited

U.S. PATENT DOCUMENTS

| | | | |
|---|---|---|---|
| D. 199,206 | 9/1964 | Rose | D30/101 |
| D. 249,169 | 8/1978 | Walker | D30/101 |
| D. 310,060 | 8/1990 | Salgado et al. | D30/101 |
| D. 346,136 | 4/1994 | Dollery | D30/101 |
| D. 357,644 | 4/1995 | Pedersen | D30/101 |
| D. 359,587 | 6/1995 | Ross | D30/101 |
| 3,848,358 | 11/1974 | Messmer . | |
| 4,086,876 | 5/1978 | Moore et al. . | |
| 4,117,805 | 10/1978 | Ward . | |
| 4,176,620 | 12/1979 | Kassos . | |
| 4,310,990 | 1/1982 | Payne . | |
| 4,351,270 | 9/1982 | Sabin . | |
| 4,516,529 | 5/1985 | Lotito et al. | 119/245 |
| 4,754,571 | 7/1988 | Riechmann . | |
| 4,995,334 | 2/1991 | Wechsler . | |
| 5,040,489 | 8/1991 | Drake | 119/245 |
| 5,056,463 | 10/1991 | Wilkins et al. . | |
| 5,090,358 | 2/1992 | Waldman . | |
| 5,135,400 | 8/1992 | Ramey . | |
| 5,183,004 | 2/1993 | Trent et al. . | |
| 5,230,298 | 7/1993 | Pearce . | |
| 5,551,378 | 9/1996 | Dewalt | 119/247 |

*Primary Examiner*—Thomas Price
*Attorney, Agent, or Firm*—Marshall & Melhorn

[57] ABSTRACT

An aquarium-terrarium ecosystem with both a containing area and a body of water is formed from a bottom section, a plurality of side plates, a concave shaped midsection, and a top section. The bottom section has at least three side edges. Each one of said plurality of side plates is attached to one of the side edges of the bottom section. Each one of the plurality of side edges extends substantially vertical from said bottom section. The longitudinal edges of each one of said plurality of side plates are connected to adjacent longitudinal side edges of adjacent side plates to form a polyhedron for containing a body of water. The polyhedron has a top edge. The concave midsection has both a forward and rear edge. The midsection is connected to at least a portion of the top edge of the polyhedron to form a separate containing area apart from the body of water. The forward edge of the midsection partially extends into the polyhedron to form an interface between the body of water and the separate containing area. The top section has a lower edge. The lower edge is connected to the rear edge of the midsection and the top edge of the polyhedron to enclose the aquarium-terrarium ecosystem.

19 Claims, 4 Drawing Sheets

AQUARIUM-TERRARIUM ECOSYSTEM APPARATUS

BACKGROUND OF THE INVENTION

The invention relates to a combination aquarium-terrarium apparatus. More specifically a terrarium surface is incorporated into an aquarium. The terrarium is constructed of a concave midsection extending from the rear edge of the midsection of the apparatus to form a view of a harbor or a lagoon. The rear edge of the midsection of the terrarium extends outward from the aquarium surface to minimally inhibit access to the top of the aquarium.

The prior art consists mainly of devices in which A terrarium is constructed of a single shelf extending from a wall of the aquarium. Two of such patents are U.S. Pat. No. 5,183,004 issued to Trent and U.S. Pat. No. 4,176,620 to Kassos.

Kassos discloses a combined aquarium/terrarium tank that utilizes edge surfaces to form a terrarium floor. The edge surfaces are affixed or adhered to side walls, or the back wall, of the aquarium tank. The terrarium compartment has a triangular cross-section formed by the space above the terrarium floor and part of the side walls of the aquarium tank. The forward edge of the terrarium floor forms an opening between the opposing side wall and the edge of the terrarium surface.

The patent issued to Trent et al. teaches a self contained vivarium simulating an ecosystem. The apparatus includes a lower section having a plurality of transparent walls with an upper frame member having an inner rim extending inwardly toward the middle of the lower section. The upper frame member has a rigid land plate with a dry and wet area that provides both an island or beach and a shallow section of water which acts as an intermediate surface between the water and the dry area. An top section is then placed over the other sections to complete the device.

Thus, the prior art does not disclose the structure of the present invention, wherein plates are affixed at specific angles and extend into the interior of the structure to provide a containing area or a plurality of separate containing areas. The plates do not obstruct a person's line of sight through the aquarium. Furthermore, it would be advantageous for an aquarium-terrarium apparatus to have a terrarium section which did not inhibit sight into the body of water. It would also be advantageous for an aquarium-terrarium apparatus to have a terrarium section which does not restrict access to the aquarium.

SUMMARY OF THE INVENTION

In accordance with the present invention an aquarium-terrarium ecosystem apparatus is provided. The apparatus includes a body of water and a containing area. The apparatus includes a polygonal bottom section having at least three side edges. A plurality of side plates is provided. Each of the side plates are attached to one of the edges of the bottom section and extend substantially vertical from the bottom section. Each of the side plates have longitudinal edges connected to longitudinal edges of the adjacent side plates, forming a polyhedron. The polyhedron has a top edge.

The apparatus has a concave shaped midsection. The midsection has both a forward edge and a rear edge. The midsection is connected to at least a portion of the top edge of the polyhedron. The concave shaped midsection forms a separate containing area apart from the body of water.

The apparatus also has a top section with a lower edge. The lower edge of the top section is connected to the top edge of said polyhedron and the rear edge of the midsection. The top section encloses the apparatus.

In the most preferred embodiment, the midsection includes a series of angled plates. The forward edge of said series of angled plates includes a series of interconnected sections. The inconnected sections extend from the rear edge of the midsection. The series of inconnected sections are angled ninety degrees or less from the rear edge. The series of angled plates from a plurality of separate containing areas.

The present apparatus provides an aquarium-terrarium in which the terrarium does not inhibit sight into the body of water. The terrarium section also does not inhibit access into the aquarium. Lastly, the terrarium section may consist of various configurations, including an island, a harbor, a lagoon, or a lake.

DESCRIPTION OF THE PREFERRED EMBODIMENTS

Figure 1:
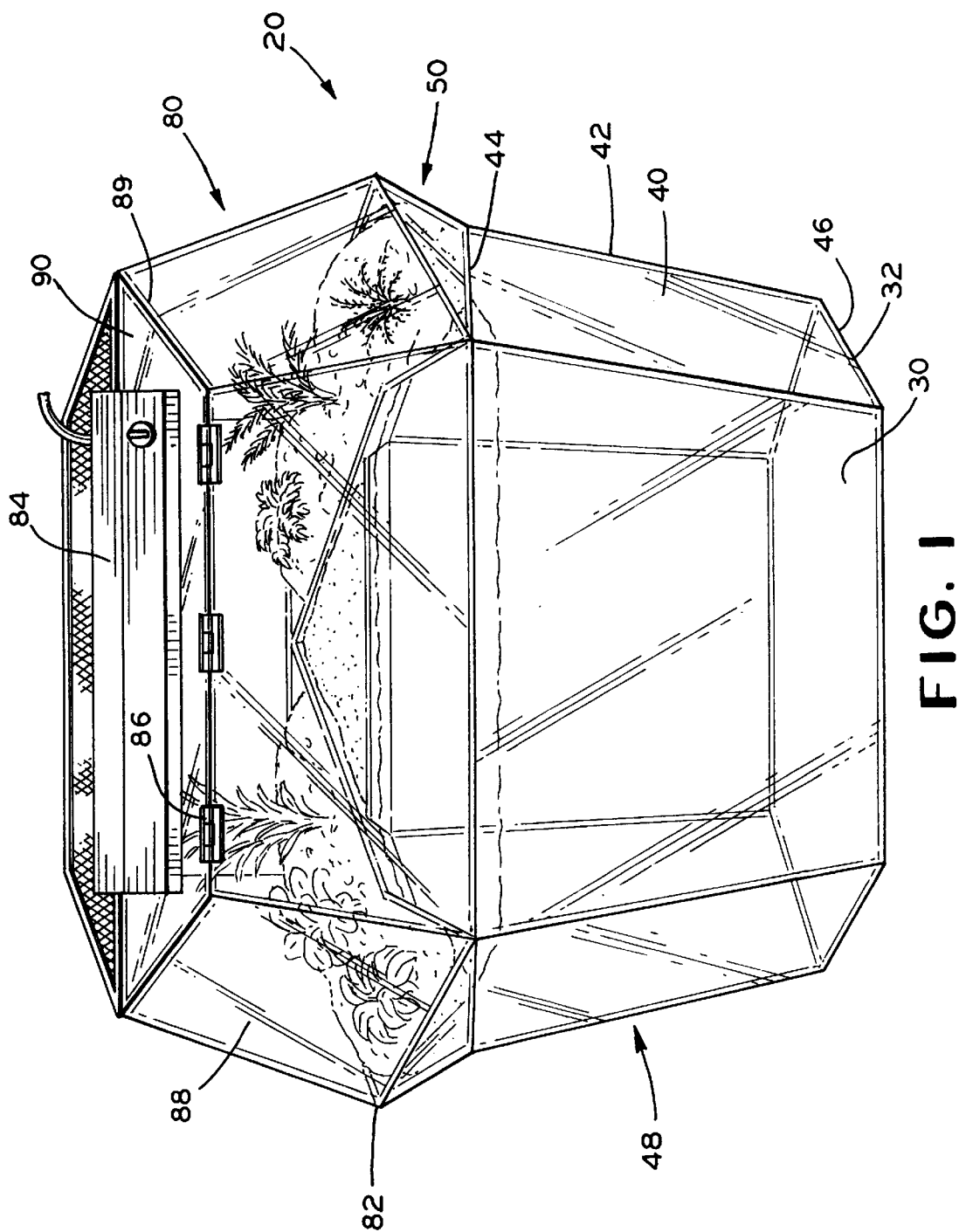
FIG. 1 is a perspective view of a hexagonal shaped aquarium-terrarium apparatus.

Referring now to the drawings, FIG. 1 is a perspective view of a hexagonal shaped aquarium-terrarium apparatus 20. The apparatus 20 is composed of a bottom section 30, a plurality of side plates 40, a midsection 50, and a top section 80.

Figure 2:
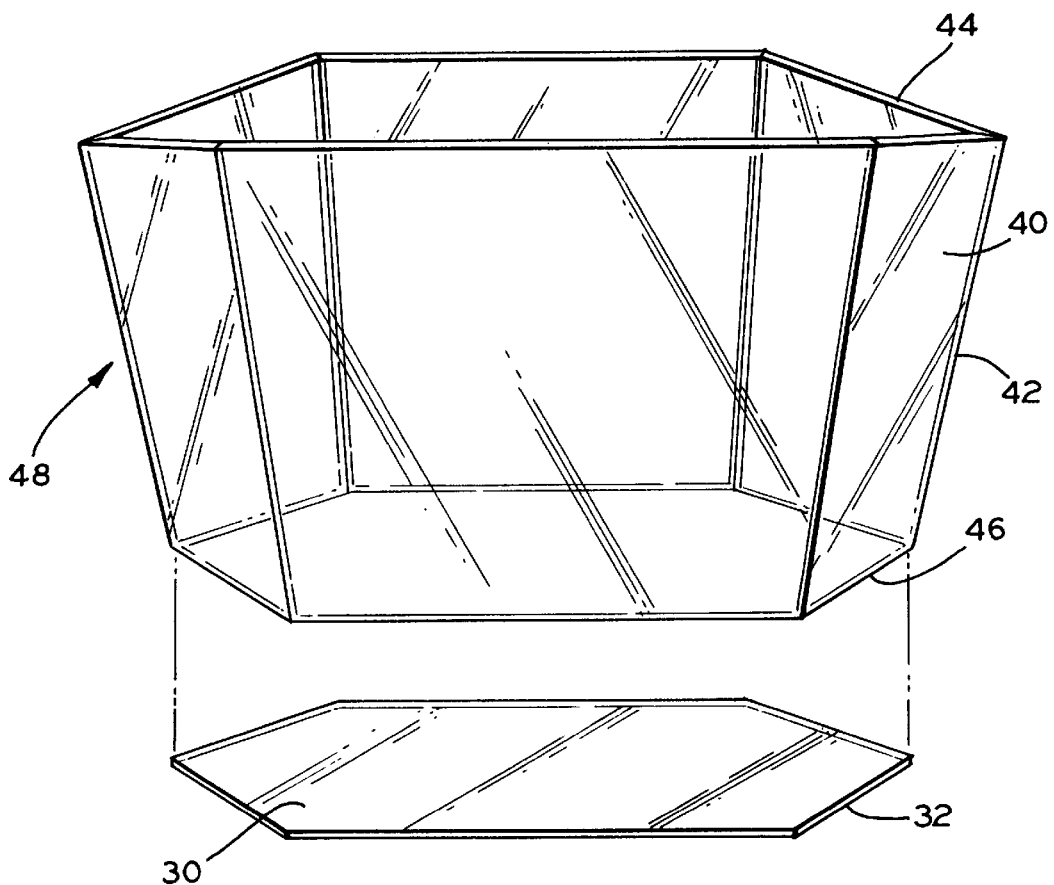
FIG. 2 is an exploded view of the polyhedron of the aquarium-terrarium apparatus.

The bottom section 30 is shaped as a polygon having at least three side edges 32. FIG. 2 is a view of the polyhedron of a hexagonal apparatus 20. The polyhedron includes a bottom section 30 shaped as a hexagon. The bottom section has six side edges 32. One side edge corresponds with each one of a plurality side plates 40.

The present invention is not limited to a particular shape. This invention may be practiced by any configuration which consists of at least three sides. In a preferred embodiment, the apparatus is shaped as a hexagon or rectangle.

A plurality of side plates 40 is provide. Each one of the plurality of side plates is a rectangular shape. Each one of the side plates has two longitudinal edges 42 and a top and bottom edge 44,46.

The number of side plates 40 correspondences with the number of side edges 32 of the bottom section 30. Each one of the plurality of side plates 40 extends substantially vertical from the bottom section 30. In a preferred embodiment, the bottom edge 46 of each one of said side plates 40 is attached to a corresponding side edge 32 of the bottom section 30. In the preferred embodiment, each one of said plurality of side plates 40 form an obtuse angle with said bottom section 30.

Each one of said pair of longitudinal edges 42 of each side plate 40 is connected to another longitudinal edge 42 of an adjacent side plate 40. The plurality of side plates 40 and the bottom section 30 form a polyhedron 48 for containing a body of water. The polyhedron 48 has a top edge 44.

Figure 4:
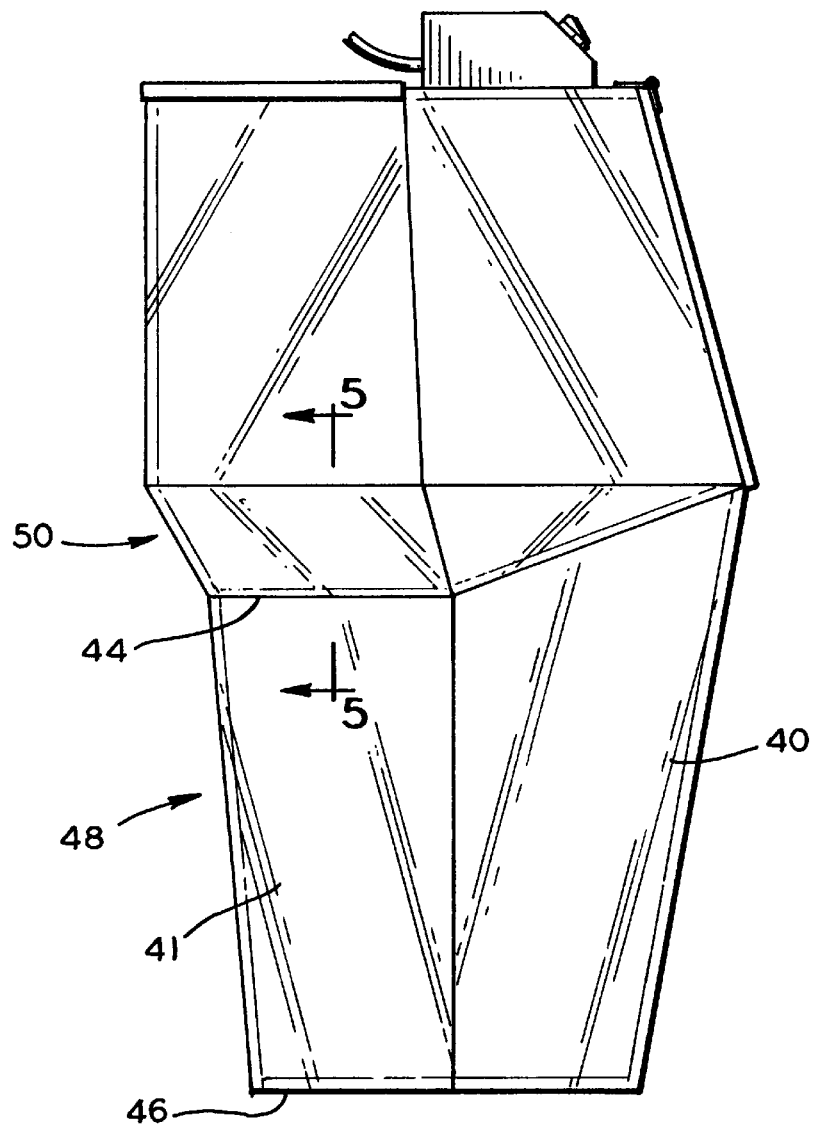
FIG. 4 is an elevated view of the aquarium-terrarium apparatus shaped as a hexagon.

As shown in FIG. 4, in an alternative embodiment, at least one of said plurality of side plates 40 has a segment 41 which is shorter in length then the remaining section of the plurality of side plates 40. The midsection 50 is disposed on the top edge of the segment 41.

Figure 3:
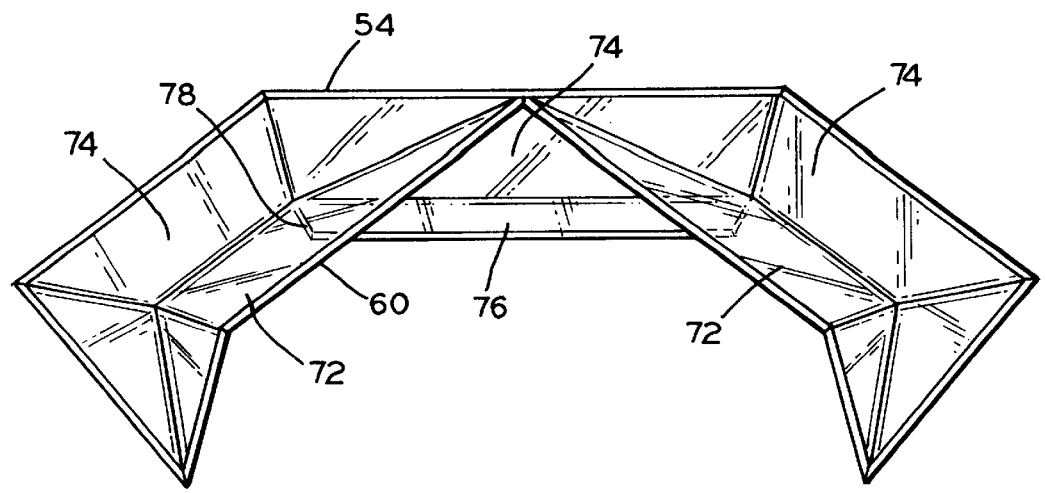
FIG. 3 is a view of the midsection of an aquarium-terrarium apparatus.
Figure 5:
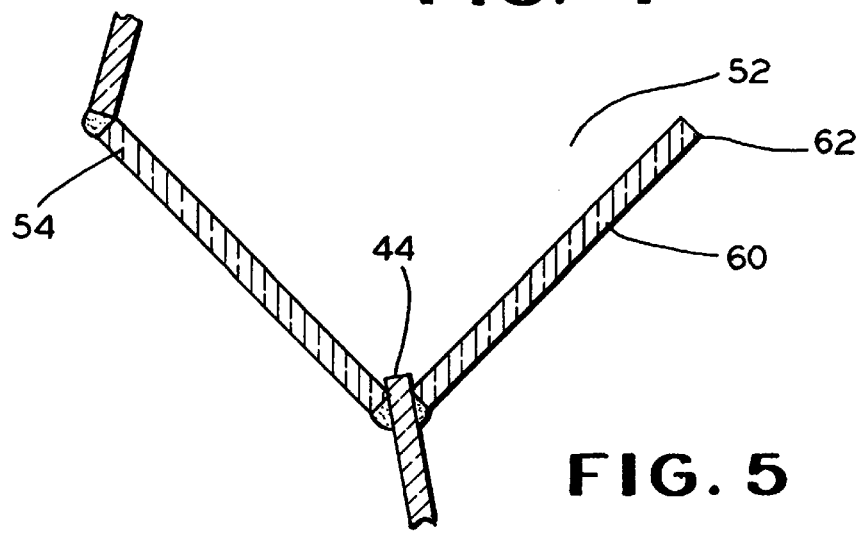
FIG. 5 is a cross view along line 5—5 of the junction of the forward edge and the rear edge of the midsection and the polyhedron.

As shown in FIG. 3, a midsection 50 is concave shaped and has forward and rear edges 60, 54. The forward and rear edges 60, 54 of the midsection outline a substantially U-shaped containing area 52, as shown in FIG. 5. This is the concave configuration of the midsection 50. The purpose of the midsection 50 is to from the containing area 52. The containing area 52 is apart from the body water. The containing area 52 retains material separate and apart from the body of water in the polyhedron 48. The connections of the elements or subelements of the midsection 50 should be watertight.

The midsection 50 is connected to at least a portion of the top edge 44 of the polyhedron 48. In an alternative embodiment, the midsection 50 is attached along the entire top edge 44 of the polyhedron 48.

As shown in FIG. 5, the forward edge 60 of the midsection extends into the polyhedron 48. The forward edge 60 forms an interface 62 between the body of water and the separate containing area 52. The forward edge 60 of the midsection 50 consists of at lest one rectangular shaped plate. Each plate extends from the top edge 44 of the polyhedron 48. Each plate extends from the polyhedron 48 to form a concave shape with the rear edge 54.

In the case of a terrarium with real plants or soil, the water line of the polyhedron 48 must not be above the forward edge 60 of the midsection 50. This is shown in FIG. 1.

Figure 6:
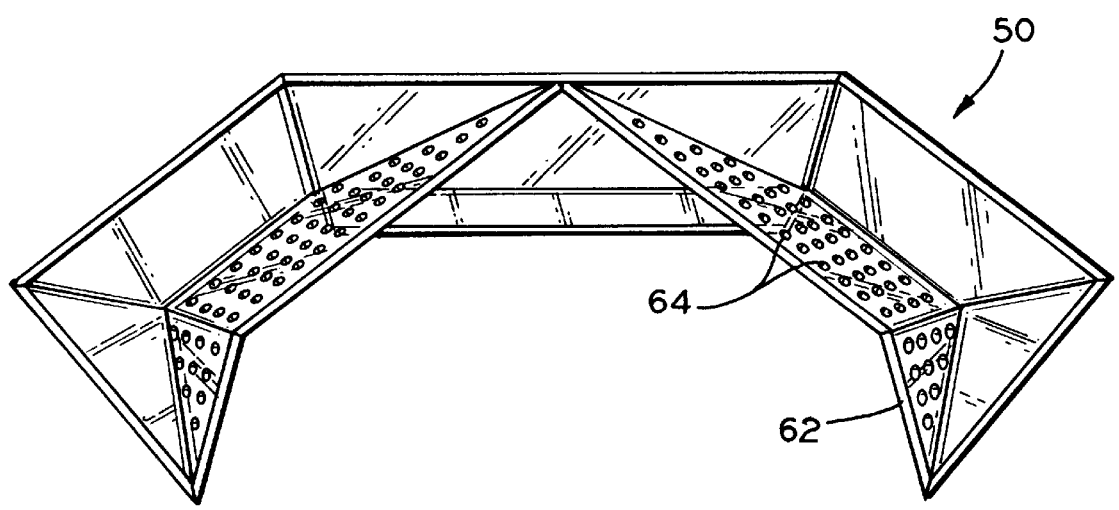
FIG. 6 is a top view of the midsection.

As shown FIG. 6, in an alternative embodiment, the forward edge 62 of the midsection 50 includes a plurality of apertures 64 for concealing the accessories for the body of water. An example for the uses of the apertures 64 is to conceal the hose or hoses for a filter for the body of water. The apertures 64 may also be used to conceal piping for other accessories, such bubblers, heaters, waterfalls, etc.

The apertures 64 may also form a means for hydroponically sustaining plant life in said containing area 52. To hydroponically sustain plant life, the feces of the fish in the body of water is used to fertilize the plant life. The forward edge 60 must include apertures 64 to allow the feces in the water to fertilize the soil in the containing area 52. The forward edge 60 may be constructed of plastic covered wire mesh. Alternatively, the forward edge 60 may also be constructed of glass or plastic which includes a series of apertures 64.

As shown in FIG. 3, in a preferred embodiment, the concave midsection 50 includes a series of angled plates. The forward edge 60 of the series of the angled plates includes a series of interconnected sections 72 extending from the rear edge 54 of the midsection 50. Each one of said series of interconnected sections 72 is angled ninety degrees or less from the rear edge 54. The series of angled plates form a plurality of separate containing areas 74.

In a most preferred embodiment, one of the series of interconnected sections is disposed beneath an adjoining two of the series of interconnected sections 76. The one of the series of interconnected plates 76 is affixed to the top edge 44 of the polyhedron 48. The one of the series of interconnected sections 76 is quadrangular shaped. The one of the series of interconnected section has two longitudinal edges 78. Each longitudinal edge 78 is connected to one the two interconnected sections 72 disposed above the one of the series of interconnected sections 76.

The containing area 52 formed by the midsection may contain soil, gravel, rock or sand. The containing area 52 may contain the aforementioned solids in any combination. Alternatively, the containing area 52 may also contain various other mediums, such as water.

Traditional accessories for an aquarium or a terrarium may be incorporated into the present invention. One example is the use of bridges to connect nonadjoining containing areas. Another example is a waterfall. A waterfall may be incorporated into the midsection 50 or the top section 80 and draw water from the polyhedron 48. A final example, mirrors may be incorporated into the top section 80 or the bottom section 30 as in a conventional aquarium or terrarium.

A top section 80 includes a lower edge 82. The lower edge 82 is connected to the top edge 44 of the polyhedron 48 and the rear edge 54 of the midsection 50. The top section 80 encloses the aquarium-terrarium ecosystem. Besides enclosing the apparatus, the top section 80 provides space in the vertical direction for plant life of the containing area 52 to grow. The top section 80 also protects the contents of the apparatus 20 from contamination from outside sources.

A typical embodiment of the top section 80 is one that includes a plurality of vertical walls 88 extending from the rear edge 52 of the midsection 50 and the top edge 48 of the polyhedron 48. The vertical walls 88 are connected at a top edge 89 by a cover 90. The cover 90 prohibits access into the apparatus 20.

In a preferred embodiment, the top section 80 includes a light 84 disposed to illuminate the apparatus 20. In a most preferred embodiment, the top section 80 further includes a door 86.

In an alternative embodiment, the lower edge 82 of the top section 80 is removably connected to the top edge 44 of the polyhedron 48 and the rear edge 54 of the midsection 50 to enclose the aquarium-terrarium apparatus 20.

In another alternative embodiment the top section 80 may be constructed of a mesh material.

The present invention can be utilized as an aquarium-terrarium apparatus 20. The terrarium may retain solid matter separate and apart from the body of water in the aquarium. The terrarium does not inhibit sight or access into the body of water.

The material of construction of the apparatus 20 is either glass or plastic. Glass is the preferred material of construction. However, any clear substrate is suitable for use with the proposed invention. Each element or subelement of the apparatus is connected by the use of conventional adhesives, an example of a suitable adhesive is standard silicon glue. Standard connecting techniques, as well as standard tools, are used to attach the abutting elements or subelements. The junctions of the elements or subelements are to be water tight unless specified otherwise.

It is to be understood that the form of the invention herewith shown and described is to be taken as an illustrative embodiment only the same, and that various changes in the shape, size and arrangement of parts may be resorted to without departing from the spirit of the invention.

What we claim is:

1. An aquarium-terrarium ecosystem including a containing area and a body of water comprising:

(a) a polygonal bottom section having at least three side edges;

(b) a plurality of side plates, each of said side plates attached to one of the side edges of said polygonal bottom section and extending substantially vertical from said polygonal bottom section, each of said side plates having longitudinal edges connected to longitudinal edges of adjacent side plates to form a polyhedron for containing a body of water, said polyhedron having a top edge;

(c) a concave shaped midsection having a forward edge and a rear edge, said midsection connected to at least a portion of said top edge of said polyhedron to form a separate containing area apart from said body of water, said forward edge of said midsection partially extending into said polyhedron to form an interface between the body of water and the separate containing area; and (d) a top section having a lower edge, said lower edge connected to the top edge of said polyhedron and said rear edge of said midsection to enclose the aquarium-terrarium ecosystem.

2. An apparatus as claimed in claim 1, wherein said bottom section, said side plates, said midsection and said top section are constructed of a material selected from the group consisting of glass and plastic.

3. An apparatus as claimed in claim 1, wherein each one of said plurality of side plates and said bottom section form an obtuse angle.

4. An apparatus as claimed in claim 1, wherein said top section further includes a light disposed to illuminate said apparatus.

5. An apparatus as claimed in claim 1, wherein said top section further includes a door.

6. An apparatus as claimed in claim 1, wherein said forward edge of said concave midsection further includes a plurality of apertures for concealing a plurality of accessories for said apparatus.

7. An apparatus as claimed in claim 1, wherein said forward edge of said concave midsection includes a means for hydroponically sustaining plant life growing in said containing area.

8. An apparatus as claimed in claim 1, wherein at least one of said side plates has a segment which is shorter in length than the remaining section of said side plates and adjacent side plates, and said midsection is positioned in said segment of said side plate.

9. An apparatus as claimed in claim 1, wherein said midsection is attached along an entire length of said top edge of said polyhedron.

10. An apparatus as claimed in claim 1, wherein said concave midsection further includes a series of angled plates.

11. An apparatus as claimed in claim 10, wherein said forward edge of said series of angled plates further includes a series of interconnected sections extending from said rear edge of said midsection, each one of said series of interconnected sections is angled ninety degrees or less from said rear edge to form a plurality of separate containing areas.

12. An apparatus as claimed in claim 11, wherein one of said series of interconnected sections is disposed beneath an adjoining two of said series of interconnected sections, said one of said series of interconnected sections is affixed to said top edge of said polyhedron.

13. An apparatus as claimed in claim 1, wherein said separate containing area may contain any combination of the group consisting of soil, gravel, rock, and sand.

14. An apparatus as claimed in claim 1, wherein said separate containing area may contain a liquid.

15. An apparatus as claimed in claim 1, wherein said apparatus is hexagonally shaped.

16. An apparatus as claimed in claim 1, wherein said apparatus is rectangularly shaped.

17. An apparatus as claimed in claim 1, wherein said lower edge of said top section is removably connected to the top edge of said polyhedron and said rear edge of said midsection to enclose the aquarium-terrarium ecosystem.

18. An apparatus as claimed in claim 1, wherein said top section is constructed from a mesh material.

19. An aquarium-terrarium ecosystem including a containing area and a body of water comprising:

(a) a polygonal bottom section having at least three side edges;

(b) a plurality of side plates, each of said side plates attached to one of the sides of said polygonal bottom section and extending substantially vertical from said polygonal bottom section, each of said side plates having longitudinal edges connected to longitudinal edges of an adjacent one of said side plates to form a polyhedron for containing a body of water, said polyhedron having a top edge;

(c) a concave shaped midsection having a forward edge and a rear edge forming a containing area, said midsection partially extending into said polyhedron to form an interface between the body of water and the containing area, said forward edge and said rear edge composed of a series of angled plates, said angled plates of said forward edge comprising:

(i) a series of interconnected sections extending from said rear edge, each one of said series of interconnected sections is angled ninety degrees or less from said rear edge to form a plurality of separate containing areas, and (ii) one of said series of interconnected sections is disposed beneath an adjoining two of said series of interconnected sections, affixed to said top edge of said polyhedron; and (d) a top section having a lower edge, said lower edge connected to the top edge of said polyhedron and said rear edge of said midsection to enclose the aquarium-terrarium ecosystem.

* * * * *